(12) United States Patent
Kamps et al.

(10) Patent No.: US 9,688,484 B2
(45) Date of Patent: Jun. 27, 2017

(54) CONVEYING WHEEL AND CONVEYING SYSTEM

(71) Applicant: KHS GmbH, Dortmund (DE)

(72) Inventors: Sebastian Kamps, Goch (DE); Thomas Nitsch, Kleve (DE); Stefan Van Heukelum, Kranenburg (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 15/021,100

(22) PCT Filed: Aug. 20, 2014

(86) PCT No.: PCT/EP2014/067785
§ 371 (c)(1),
(2) Date: Mar. 10, 2016

(87) PCT Pub. No.: WO2015/036216
PCT Pub. Date: Mar. 19, 2015

(65) Prior Publication Data
US 2016/0221767 A1    Aug. 4, 2016

(30) Foreign Application Priority Data
Sep. 12, 2013    (DE) .................. 10 2013 110 081

(51) Int. Cl.
| | | |
|---|---|---|
| *B65G 35/08* | (2006.01) |
| *B65G 47/86* | (2006.01) |
| *B65G 35/06* | (2006.01) |
| *B65G 17/32* | (2006.01) |
| *B65G 47/08* | (2006.01) |

(52) U.S. Cl.
CPC .......... *B65G 47/847* (2013.01); *B65G 17/32* (2013.01); *B65G 35/06* (2013.01); *B65G 47/082* (2013.01)

(58) Field of Classification Search
CPC ....... B61B 10/025; B61B 10/00; B65G 35/06; B65G 35/08
USPC ................. 198/465.1, 795; 104/172.1, 172.2
See application file for complete search history.

(56) References Cited

U.S. PATENT DOCUMENTS

| | | | | |
|---|---|---|---|---|
| 2,893,538 A | * | 7/1959 | Buttironi | B65G 35/08 198/795 |
| 5,220,996 A | * | 6/1993 | Noestheden | B65G 17/002 198/465.1 |
| 5,368,152 A | * | 11/1994 | Rhodes | B61B 10/04 104/172.2 |

(Continued)

FOREIGN PATENT DOCUMENTS

| | | |
|---|---|---|
| DE | 10 2012 007 778 | 8/2013 |
| EP | 0 089 543 | 9/1983 |

(Continued)

*Primary Examiner* — James R Bidwell
(74) *Attorney, Agent, or Firm* — Occhiuti & Rohlicek LLP

(57) ABSTRACT

An apparatus for use in a conveying system having carriages guided on a guide of a first conveying segment, each of which has a wheel catcher that includes a conveying wheel having carriage catching areas, each of which is associated with one of several entrainers disposed along a periphery of the conveying wheel. Each entrainer has a carriage-catching surface that faces the rotation direction and that cooperates with a wheel catcher on a carriage. The entrainers are all independently controllable.

17 Claims, 8 Drawing Sheets

(56) References Cited

U.S. PATENT DOCUMENTS

| | | | | |
|---|---|---|---|---|
| 5,590,756 | A | * | 1/1997 | Zaguroli, Jr. ......... B61B 10/025 104/163 |
| 5,873,452 | A | * | 2/1999 | Nolan .................. B65G 17/002 198/465.3 |
| 8,820,518 | B2 | * | 9/2014 | Pac Gracia .......... B65G 17/002 198/795 |
| 2003/0173186 | A1 | | 9/2003 | Hiramoto et al. |
| 2004/0168883 | A1 | | 9/2004 | Thomas et al. |
| 2010/0108473 | A1 | | 5/2010 | Soncini |
| 2013/0199894 | A1 | | 8/2013 | Papsdorf |

FOREIGN PATENT DOCUMENTS

| | | |
|---|---|---|
| EP | 0 366 225 | 5/1990 |
| EP | 2 186 759 | 5/2010 |
| EP | 2 522 605 | 11/2012 |
| WO | 2011/001356 | 1/2011 |
| WO | 2012/134548 | 10/2012 |

* cited by examiner

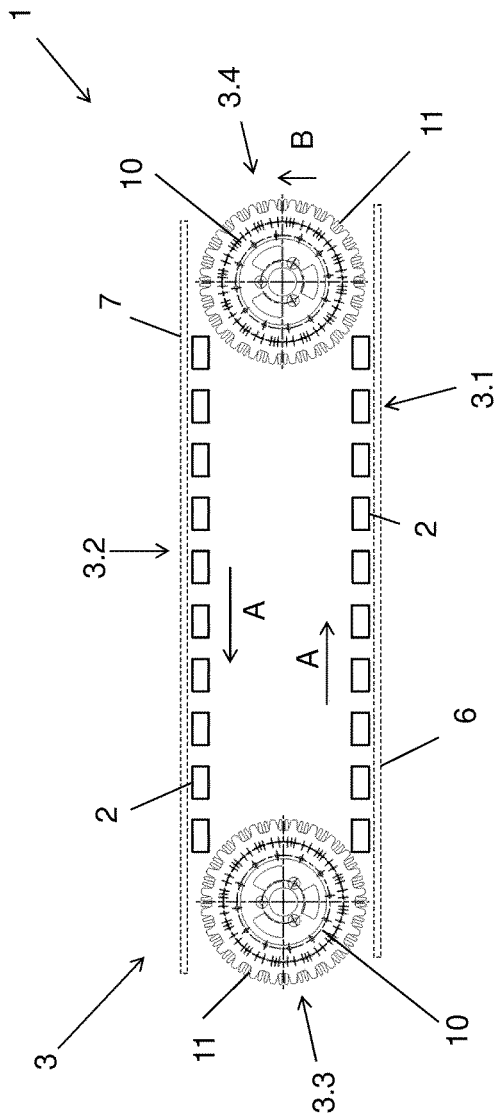

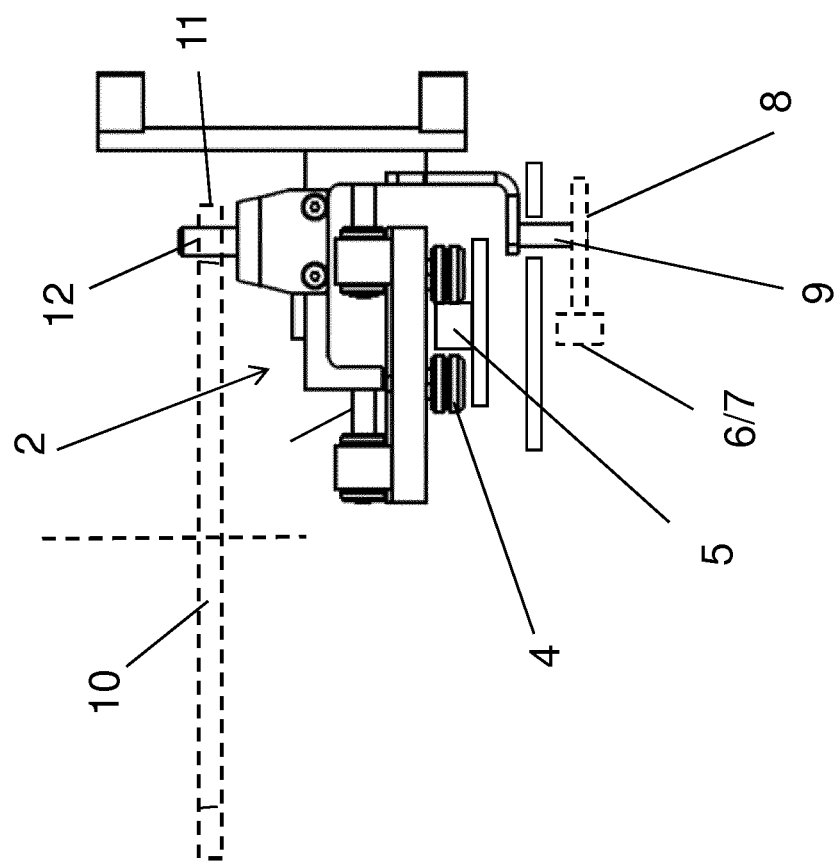

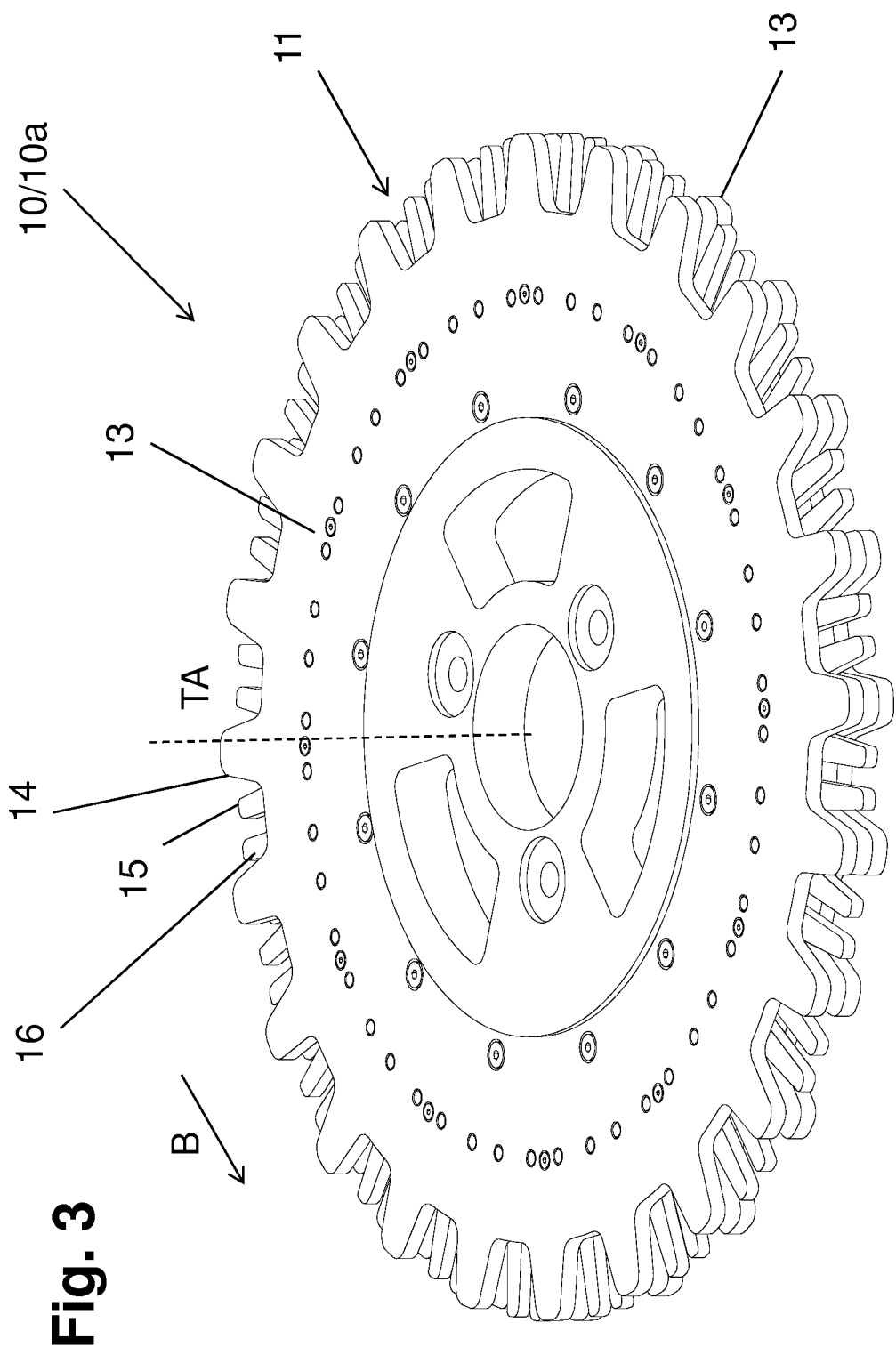

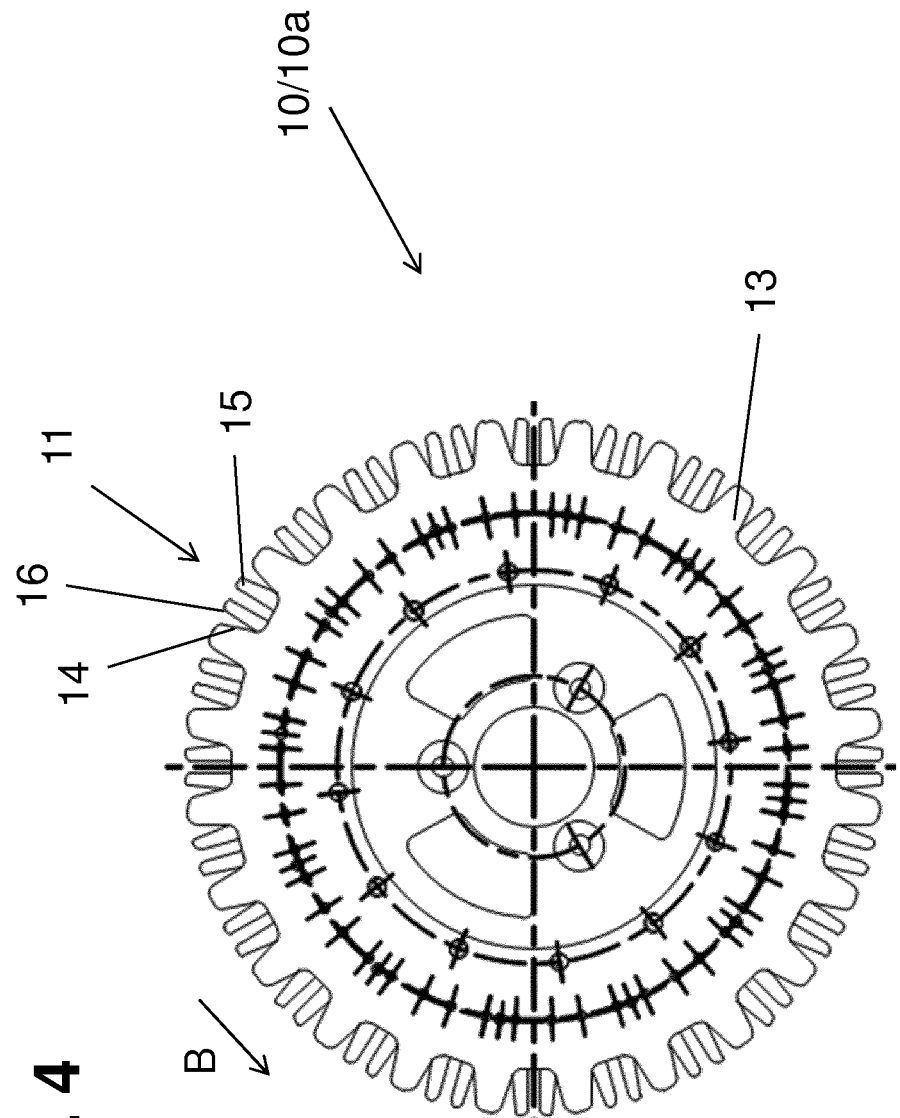

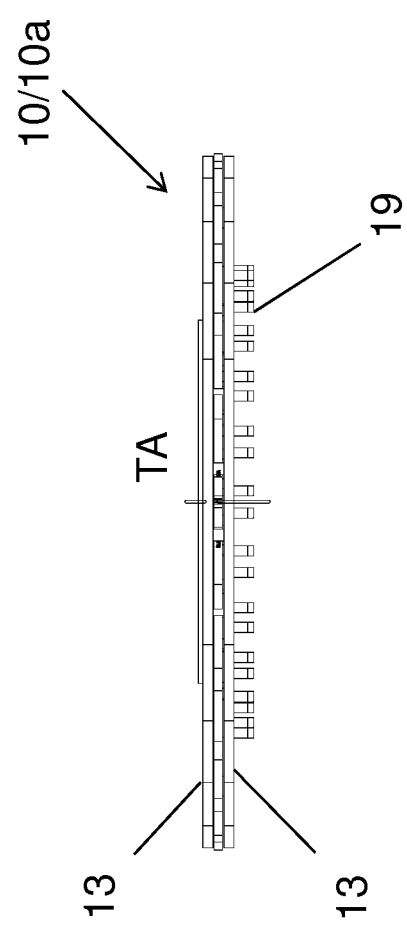

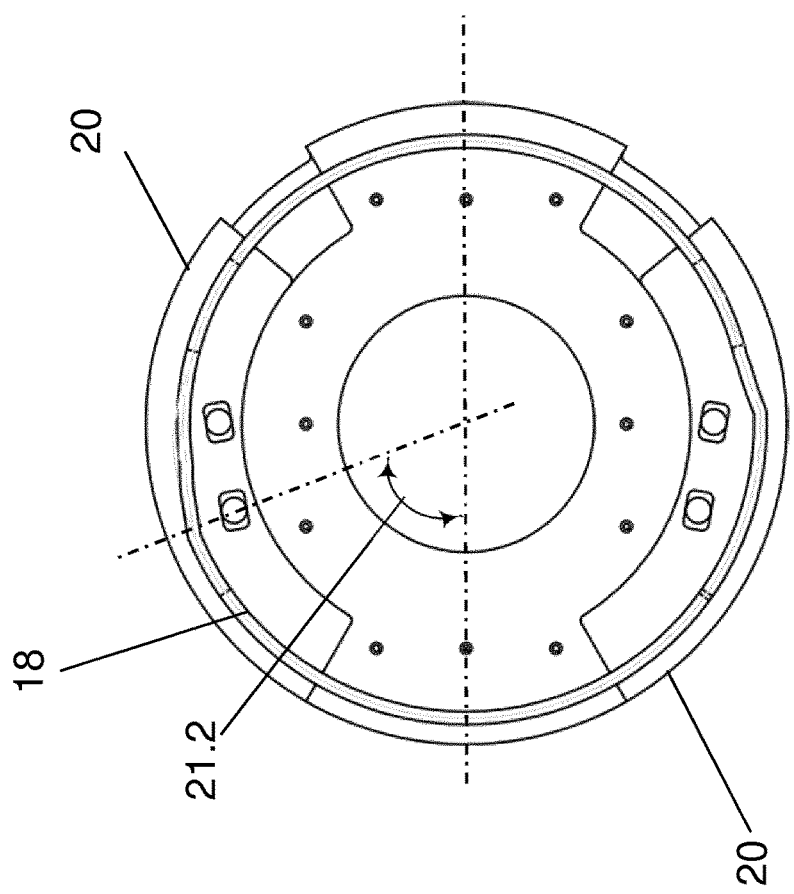
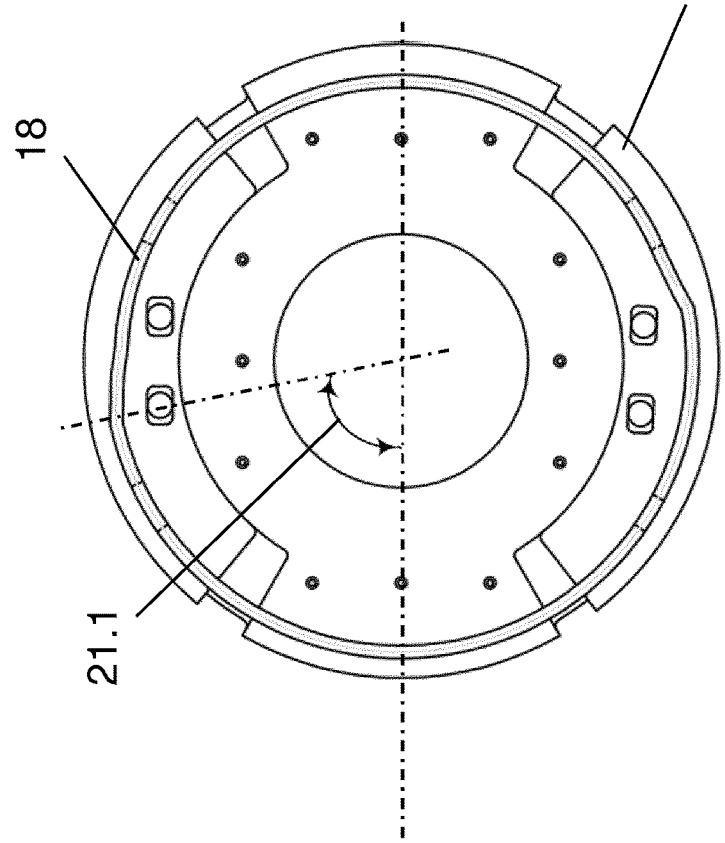

CONVEYING WHEEL AND CONVEYING SYSTEM

RELATED APPLICATIONS

This is the national stage of international application PCT/EP2014/067785, filed on Aug. 20, 2014, which claims the benefit of the Sep. 12, 2013 priority date of German application DE 102013110081.3, the contents of which are herein incorporated by reference.

FIELD OF INVENTION

The invention relates to a container processing system, and in particular, to a conveying wheel.

BACKGROUND

Conveying systems with carriages transported on a self-contained conveying segment are suitable for many applications, in particular also in the sector of the food and/or beverage industry, and in particular with devices or systems for the conveying and/or handling of containers.

With such conveying systems, it is frequently necessary for the carriages to be moved further, for example, in the area of deflections in the conveying segment, with the aid of conveying wheels, that are driven to rotate in a conveying direction of rotation.

If such a conveying wheel in a conveying device is located upstream of a conveying segment section, at which the onward movement of the carriages takes place with a feeding or conveying system located there, for example, with a feed chain, a transfer from the conveying segment stretch to the conveying wheel must take place. This transfer is often problematic, in part because, while operating the conveying system, the feed chain's length may change slightly. These changes can arise, for example, from wear and/or loading have occurred in the feeding system or feed chain.

SUMMARY

The invention provides, among other things, a conveying wheel that promotes problem-free transfer of carriages to the conveying wheel.

A particular feature of the conveying wheel according to the invention lies in the fact that the catch areas comprise guiding and entraining elements, hereafter referred to as "entrainers." In some embodiments, these entrainers are fingers. The entrainers promote onward movement of the carriages with the conveying wheel when catch elements of the carriages come in contact with them. The entrainers can be controlled individually relative to the conveying wheel in the conveying wheel's direction of rotation and against this direction of rotation. Because of this, in a conveying system in which a chain carries a carriage along a conveying segment section upstream of the conveying wheel, each carriage is accelerated after its catch element has run into one of the catch areas of the conveying wheel. This acceleration arises from the entrainer's controlled. As a result of this acceleration, it is possible to reliably release the carriage from the feed system or the carriage chain or feed chain, and to do so even if the chain's length has changed as a result of wear and/or loading in the feeding system.

In one aspect, the invention features an apparatus for use in a conveying system that comprises a plurality of carriages guided on a guide of a first conveying segment, each of the carriages comprising a wheel catcher. The apparatus includes a first conveying wheel that rotates in a rotation direction about a wheel axis and that has carriage catching areas, each of which is associated with one of a plurality of first entrainers. The first entrainers are disposed along a periphery of the first conveying wheel. A typical first entrainer has a carriage-catching surface that faces the rotation direction and that cooperates with a wheel catcher on one of the carriages. A typical entrainer is controllable independently of other entrainers. The entrainers are to move a catch surface thereof in a direction opposite the rotation direction.

Among the foregoing embodiments are those in which the first first-entrainer is pivotable about an axis parallel to the conveying wheel axis.

In other embodiments, entrainers are paired up with one and configured to pivot synchronously. Among these are embodiments in which the two entrainers pivot opposite each other. Among these are embodiments in which entrainers of a pair pivot in opposite directions and those in which one lags behind the other in the direction of rotation of the first conveying wheel.

Other embodiments feature a plurality of tooth arrangements for coupling pairs of entrainers together.

In other embodiments, a control point at which pivoting of the first first-entrainers takes place relative to the first conveying wheel is adjustable. Among these are those that have an adjustable control curve for adjustment of the control point.

In other embodiments, the first conveying wheel comprises comprising a star wheel that comprises cut-out apertures formed on a circumference thereof. These cut-out apertures are open into a space radially beyond the star wheel. The first entrainers are pivotable relative to the star wheel and define fingers that protrude into corresponding ones of the cut-out apertures. The entrainers define fingers that protrude into corresponding cut-out apertures.

In other embodiments, carriages can be moved on a closed movement path along the first conveying segment that has a deflection region. The first conveying wheel has carriage-catching areas around a circumference thereof. These carriage-catching areas engage the wheel catchers so as to propel the carriages while the carriages are in the deflection region.

Other embodiments include a chain. In these embodiments, the first conveying segment has a first conveying segment section extending along a conveying direction. Meanwhile, the chain moves the carriages along the first conveying segment section. When a wheel catcher of a carriage engages a carriage-catching area of the first conveying wheel, a carriage-catching surface of the first first-entrainer moves in the rotation direction of the first conveying wheel, thereby accelerating the carriage.

Other embodiments have a second conveying wheel identical to the first conveying wheel. The two conveying wheels are disposed at opposite ends of the first conveying segment with each being at a corresponding deflection region thereof. These two deflection regions define opposite ends of a first conveying segment section of the first conveying segment.

Yet other embodiments include a second conveying segment that is a mirror image of the first conveying segment about a plane that is disposed halfway between the first and second conveying segments.

BRIEF DESCRIPTION OF THE DRAWINGS

These and other features and advantages of the invention will be apparent from the following detailed description and the accompanying figures, in which:

FIG. 1 shows a top view of a conveying system having a plurality of carriages moved on a closed movement path;

FIG. 2 shows details of one of the carriages from FIG. 1;

FIGS. 3-5 show different views of one of the conveying wheels of the conveying wheel shown in FIG. 1;

FIG. 7 shows a guide curve for the curved pivoting of the entrainers shown in FIG. 6;

FIGS. 9 and 10 show views of an alternative embodiment similar to that shown in FIGS. 6 and 7.

DETAILED DESCRIPTION

Figure 9:
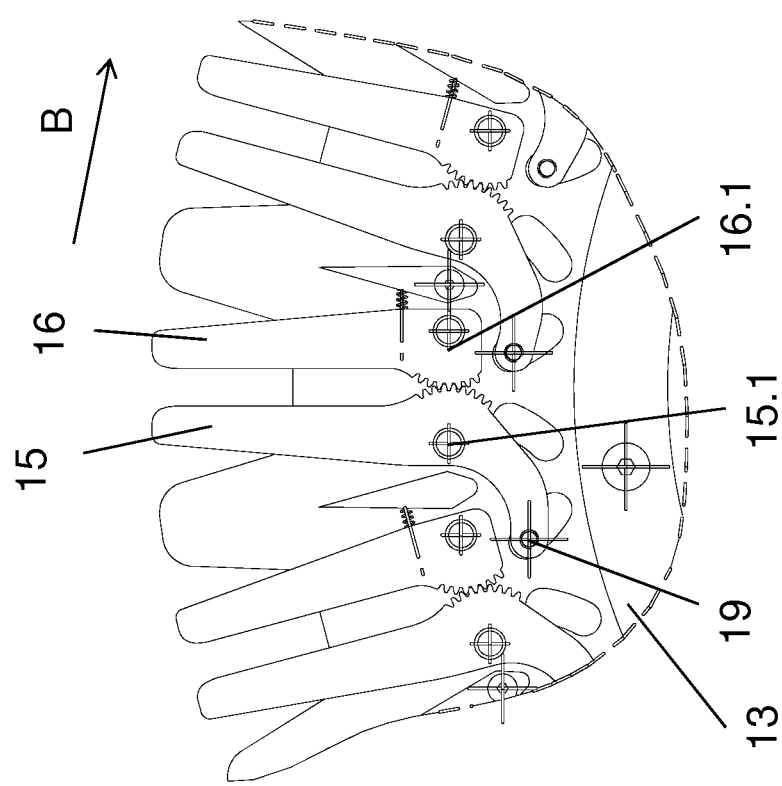

FIG. 1 shows a conveying system 1 having a plurality of carriages 2 spaced apart along a conveying direction A on a self-contained conveying segment 3 that moves the carriages 2 along the conveying direction A. The conveying segment 3 has first and second conveying-segment sections 3.1, 3.2 and first and second deflection sections 3.3, 3.4. The first and second conveying-segment sections 3.1, 3.2 extend along straight lines. The first and second deflection sections 3.3, 3.4 are where the conveying segment 3 changes direction.

The conveying system 1 also has first and second chains 6, 7. Each of the first and second chains 6, 7 has feed links 8, best seen in FIG. 2. The first conveying segment 3.1 uses the first chain 6 to move carriages 2 along the conveying direction A. Similarly, the second conveying segment 3.2 uses the second chain 7 to move carriages 2 in a direction parallel to but opposite the conveying direction A. The first and second chains 6, 7 can be carriage chains or feed chains. Each chain 6, 7 forms an endlessly running closed loop, the loop plane of which is perpendicular to a horizontal plane defined by the conveying segment 3.

Referring now to FIG. 2, the carriage 2 has guide rollers 4 that engage a guide 5 to guide the carriage 2 along the conveying segment 3. Each carriage 2 also has a chain catcher 9 to engage feed links 8 of the first or second chain 6, 7 so that the chain 6, 7 can move the carriage 2 along the first or second conveying segment section 3.1, 3.2.

Referring back to FIG. 1, when a chain 6, 7 brings a carriage 2 to a deflection section 3.3, 3.4 there is a handover to a conveying wheel 10. This handover results in the carriage 2 being propelled by the conveying wheel 10 instead of by the chain 6, 7.

Each conveying wheel 10 rotates synchronously with the first and second chains 6, 7 about a conveying wheel axis TA perpendicular to the plane of the conveying segment 3, as shown in FIG. 3. In the illustrated embodiment, the conveying wheel axis TA is vertical or essentially vertical.

In the embodiment shown, the two conveying wheels 10 are identical. Along its circumference, each conveying wheel 10 forms carriage-catching areas 11 for engaging a wheel catcher 12 on the carriage 2. In FIG. 2, the wheel catcher 12 is a pin on the carriage 2.

A handover occurs in which the carriage 2 disengages from the chain 6, 7 and engages the conveying wheel 10. This handover occurs in such a way that, as soon as the carriage's wheel catcher 12 has fully engaged the wheel's carriage-catching area 11, the chain 6, 7 dips so that the carriage's chain catcher 9 can disengage itself from chain's feed link 8. The carriage 2 then accelerates as a result of having engaged the wheel 10.

Figure 6:
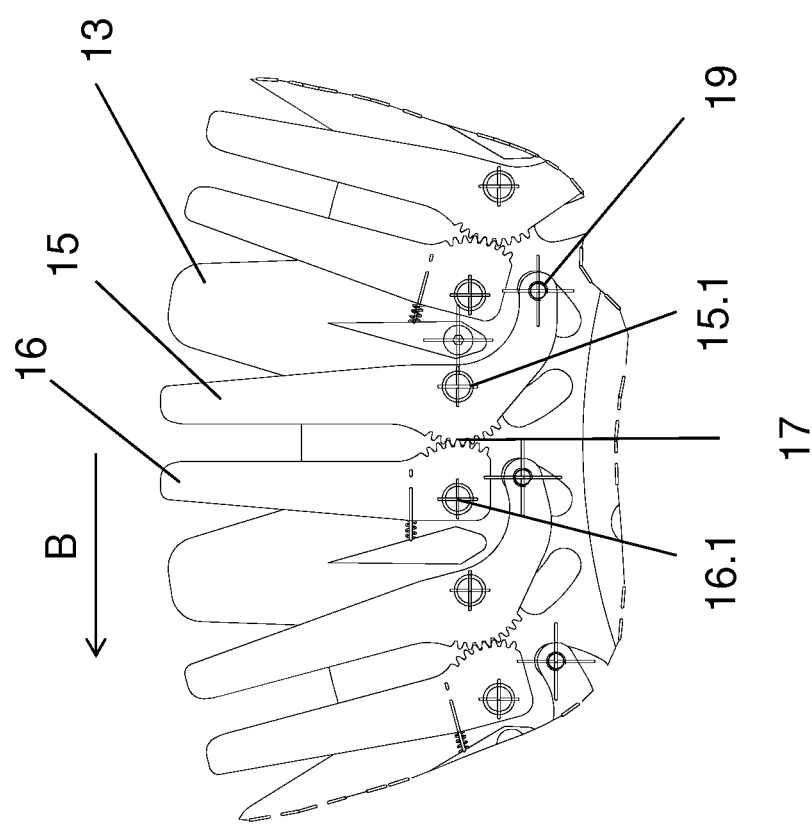
FIG. 6 shows entrainers from the conveying wheel from FIGS. 3-5.

Referring to FIG. 3, each conveying wheel 10 comprises identical first and second star wheels 13 arranged coaxially with the conveying wheel axis TA with cut-out apertures 14 open on the circumference thereof. Referring now to FIG. 4, each cut-out aperture 14 has associated first and second guiding and entraining elements 15, 16, hereinafter referred to as "entrainers." As shown in FIG. 6, the wheel 10 rotates in a conveying direction B in such a way that the first entrainer 15 arrives at a specified angular position after the second entrainer 16 has already arrived there. For this reason, the first entrainer 15 is the "lagging" entrainer and the second entrainer 16 is the "leading" entrainer.

The first and second entrainers 15, 16 are mounted on the star wheels 13 so that they can pivot about respective first and second entrainer axes 15.1, 16.1 parallel to the conveying wheel axis TA, as shown in FIG. 9.

As shown in FIGS. 6 and 9, the first and second entrainers 15, 16 define fingers that extend into the cut-out aperture 14. These fingers pivot individually between a first state, in which their sides face one another, which form catch and guiding surfaces for the wheel catchers 12, are located in the area of the side surfaces of the apertures 14, and exhibit a greater distance interval from one another, and a state running in the opposite direction, in which the guiding and entraining elements 15 are pivoted laterally into the respective aperture 14, and their surfaces facing one another exhibit a distance interval from one another that is equal to or slightly greater than the cross-section of the wheel catchers 12. The entrainers 15, 16 therefore form between them a contact and guide area that is radially open in relation to the conveying wheel axis TA. Pivoting the entrainers 15, 16 out of the first state into the second state accelerates a carriage 2 at the time of the handover to the conveying wheel 10 by way of the first entrainers 15 and the wheel catcher 12, A tooth arrangement 17 connects the first and second entrainers 15, 16. The connection with the tooth arrangement 17 is such that pivoting the first entrainer 15 and the wheel catcher 12 pivots the associated second entrainer 16 in the opposite direction.

Referring now to FIGS. 7 and 10, a control curve 18 causes individually controlled pivoting of the first and second entrainers 15, 16 of each carriage-catching area 11. It does so when it engages a bolt 19 at one end of the first entrainer 15, as shown in FIGS. 6 and 9, and in side view in FIG. 5.

The control curve 18 shown in FIGS. 7 and 10 is on a machine frame that does not rotate with the conveying wheel 10. Ideally, the control curve 18 has at least one adjustment element 20 that adjusts an angular position 21.1, 21.2 of a control point at which the bolt 19 engages the control curve 18. Such adjustment permits the control curve 18 to accommodate for changes in length of the carriage chains or feed chains 6 due to wear or the influence of heat.

Figure 8:
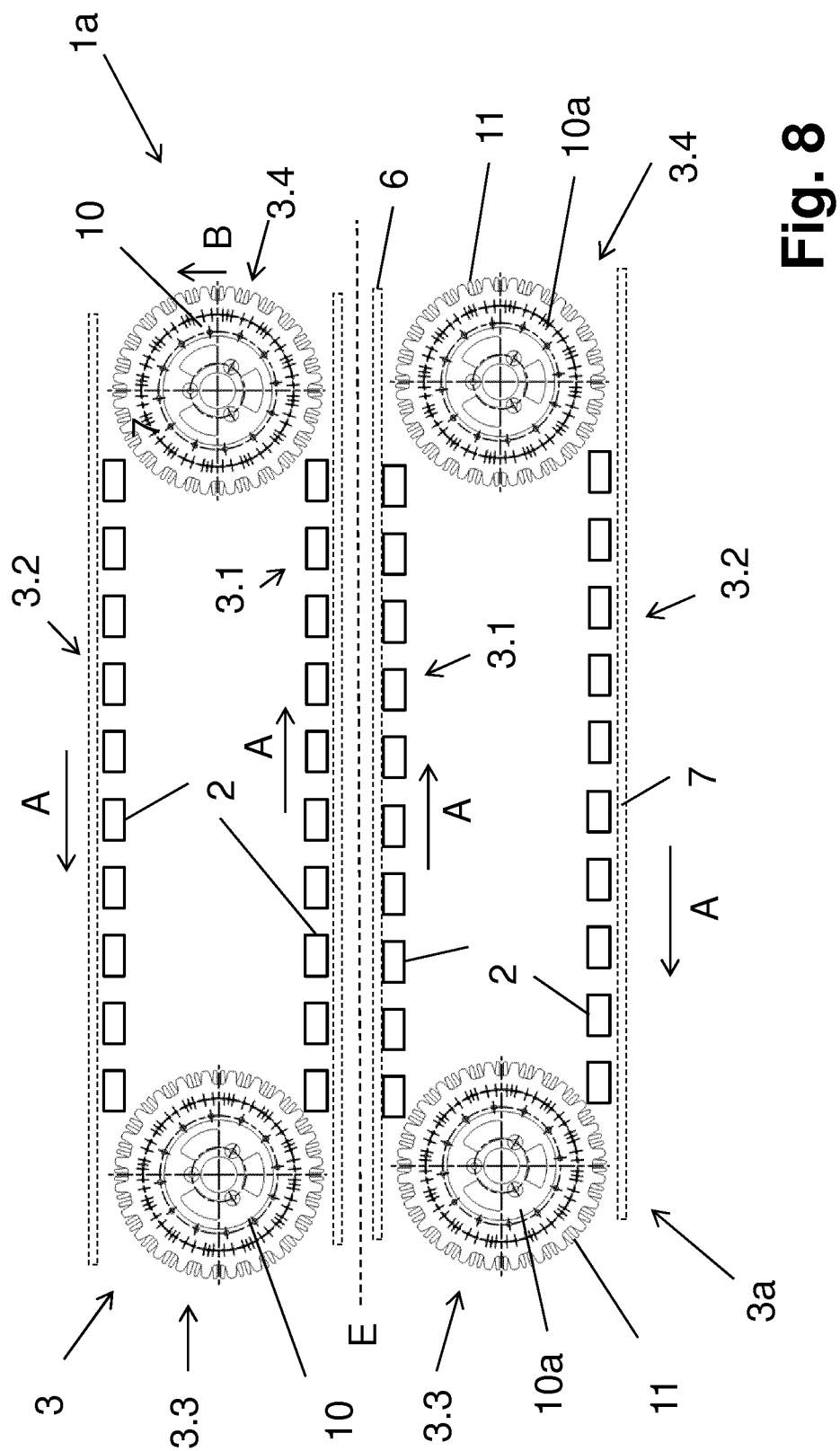
FIG. 8 shows a conveying system similar to that shown in FIG. 1 with a further conveying segment.

FIG. 8 shows an alternative conveying system 1a that differs from the conveying system 1 having first and second conveying segments 3, 3a that are mirror images of each other about a plane of symmetry E oriented parallel to the conveying segment sections 3.1 of the first and second conveying segments 3, 3a and perpendicular to a plane defined by the first and second conveying segments 3, 3a.

The conveying system 1a thus has a pair of first chains 6, a pair of second chains 7, and two pairs of conveying stars 10, 10a, all of which are synchronized so that the first and second conveying segments 3, 3a move carriages 2 at the same speed and in the same directions and so that carriages 2 carried by the first conveying segment sections 3.1 of the two conveying segments 3, 3a remain opposite each other as they move together in the conveying direction A along the plane of symmetry E.

As FIGS. 9 and 10 show, the control curves 18 and the arrangements of entrainers 15, 16 of the two conveying wheels 10, 10a differ from each other such that both conveying wheels 10, 10a will accelerate carriages 2 at handover in the same way.

The conveying systems 1, 1a described herein are well-suited for widely differing applications, including, but not limited to, conveying and/or handling of containers carried by the carriages 2. The conveying system 1a shown in FIG. 8 is also well-suited for assembling containers into container groups and/or for compacting container groups. In this case, the containers are moved on a container conveyor in the conveying direction A between the two conveying segment sections 3.1 and are assembled and compacted with function elements provided at the carriages 2 to form container groups. Within these container groups, the containers butt up against each other.

The invention has been described through several exemplary embodiments. However, numerous alterations and derivations are possible, without thereby departing from the inventive concept underlying the invention, which is described in the attached claims.

Having described the invention, and a preferred embodiment thereof, what we claim as new, and secured by Letters Patent is:

1. An apparatus for use in a conveying system that comprises a plurality of carriages guided on a guide of a first conveying segment, each of said carriages comprising a wheel catcher, said apparatus comprising a first conveying wheel that rotates in a rotation direction about a wheel axis, wherein said first conveying wheel comprises carriage catching areas, each of which is associated with one of a plurality of first entrainers, wherein said first entrainers are disposed along a periphery of said first conveying wheel, wherein said first entrainers comprise a first first-entrainer, wherein said first first-entrainer comprises a carriage-catching surface that faces said rotation direction and that cooperates with a wheel catcher on a carriage, wherein each of said first first-entrainer is controllable independently of other first entrainers, and wherein said first first-entrainer is configured to move a catch surface thereof in a direction opposite said rotation direction, said apparatus further comprising a plurality of second entrainers, wherein each of said second entrainers is associated with a corresponding one of said first entrainers, wherein said plurality of second entrainers comprises a first second-entrainer, wherein said first second-entrainer is pivotable in synchrony with said first first-entrainer.

2. The apparatus of claim 1, wherein said first first-entrainer is pivotable about an axis parallel to said conveying wheel axis.

3. The apparatus of claim 1, wherein said first second-entrainer is configured to pivot in a direction opposite that in which a first first-entrainer pivots.

4. The apparatus of claim 1, wherein, said first first-entrainer lags behind said first second-entrainer in said rotation direction of said first conveying wheel.

5. The apparatus of claim 1, further comprising a plurality of tooth arrangements, wherein said plurality of tooth arrangements comprises a first tooth-arrangement, wherein said first tooth-arrangement couples said first first-entrainer and said second second-entrainer.

6. The apparatus of claim 1, further comprising a second conveying segment, said second conveying segment being a mirror image of said first conveying segment about a plane that is disposed halfway between said first and second conveying segments.

7. The apparatus of claim 1, wherein a control point at which pivoting of said first first-entrainers takes place relative to said first conveying wheel is adjustable.

8. The apparatus of claim 7, further comprising an adjustable control curve for adjustment of said control point.

9. The apparatus of claim 1, wherein said first conveying wheel comprises comprising a star wheel that comprises a plurality of cut-out apertures formed on a circumference thereof, said apertures being open into a space radially beyond said star wheel, wherein said first entrainers are pivotable relative to said star wheel, wherein said first entrainers define fingers that protrude into corresponding ones of said cut-out apertures, wherein said plurality of cut-out apertures comprises a first cut-out aperture, and wherein said first first-entrainer defines a finger that protrudes into said first cut-out aperture.

10. The apparatus of claim 1, further wherein carriages can be moved on a closed movement path along said first conveying segment, said first conveying segment comprising a deflection region, wherein said first conveying wheel comprises carriage-catching areas around a circumference thereof, wherein said carriage-catching areas are configured to engage said wheel catchers so as to propel said carriages while said carriages are in said deflection region.

11. The apparatus of claim 10, further comprising a chain, wherein said first conveying segment comprises a first conveying segment section extending along a conveying direction, wherein said chain moves said carriages along said first conveying segment section, wherein said first first-entrainer is controlled such that when a wheel catcher of a carriage engages a carriage-catching area of said first conveying wheel, a carriage-catching surface of said first first-entrainer moves in said rotation direction of said first conveying wheel, thereby accelerating said carriage.

12. The apparatus of claim 1, further comprising a second conveying wheel identical to said first conveying wheel, wherein said first and second conveying wheels are disposed at opposite ends of said first conveying segment, wherein said first conveying wheel is disposed at a first deflection region of said first conveying segment and said second conveying wheel is disposed at a second deflection region of said first conveying segment, wherein said first and second deflection regions define opposite ends of a first conveying segment section of said first conveying segment.

13. An apparatus for use in a conveying system that comprises a plurality of carriages guided on a guide of a first conveying segment, each of said carriages comprising a wheel catcher, said apparatus comprising a first conveying wheel that rotates in a rotation direction about a wheel axis, wherein said first conveying wheel comprises carriage catching areas, each of which is associated with one of a plurality of first entrainers, wherein said first entrainers are disposed along a periphery of said first conveying wheel, wherein said first entrainers comprise a first first-entrainer, wherein said first first-entrainer comprises a carriage-catching surface that faces said rotation direction and that cooperates with a wheel catcher on a carriage, wherein each of said first first-entrainer is controllable independently of other first entrainers, wherein said first first-entrainer is configured to move a catch surface thereof in a direction opposite said rotation direction, and wherein a control point at which pivoting of said first first-entrainers takes place relative to said first conveying wheel is adjustable.

14. The apparatus of claim 13, further comprising an adjustable control curve for adjustment of said control point.

15. An apparatus for use in a conveying system that comprises a plurality of carriages guided on a guide of a first conveying segment, each of said carriages comprising a wheel catcher, said apparatus comprising a first conveying wheel that rotates in a rotation direction about a wheel axis, wherein said first conveying wheel comprises carriage catching areas, each of which is associated with one of a plurality of first entrainers, wherein said first entrainers are disposed along a periphery of said first conveying wheel, wherein said first entrainers comprise a first first-entrainer, wherein said first first-entrainer comprises a carriage-catching surface that faces said rotation direction and that cooperates with a wheel catcher on a carriage, wherein each of said first first-entrainer is controllable independently of other first entrainers, wherein said first first-entrainer is configured to move a catch surface thereof in a direction opposite said rotation direction, and wherein said first conveying wheel comprises comprising a star wheel that comprises a plurality of cut-out apertures formed on a circumference thereof, said apertures being open into a space radially beyond said star wheel, wherein said first entrainers are pivotable relative to said star wheel, wherein said first entrainers define fingers that protrude into corresponding ones of said cut-out apertures, wherein said plurality of cut-out apertures comprises a first cut-out aperture, and wherein said first first-entrainer defines a finger that protrudes into said first cut-out aperture.

16. An apparatus for use in a conveying system that comprises a plurality of carriages guided on a guide of a first conveying segment, each of said carriages comprising a wheel catcher, said apparatus comprising a first conveying wheel that rotates in a rotation direction about a wheel axis, wherein said first conveying wheel comprises carriage catching areas, each of which is associated with one of a plurality of first entrainers, wherein said first entrainers are disposed along a periphery of said first conveying wheel, wherein said first entrainers comprise a first first-entrainer, wherein said first first-entrainer comprises a carriage-catching surface that faces said rotation direction and that cooperates with a wheel catcher on a carriage, wherein each of said first first-entrainer is controllable independently of other first entrainers, and wherein said first first-entrainer is configured to move a catch surface thereof in a direction opposite said rotation direction, wherein carriages can be moved on a closed movement path along said first conveying segment, said first conveying segment comprising a deflection region, wherein said first conveying wheel comprises carriage-catching areas around a circumference thereof, and wherein said carriage-catching areas are configured to engage said wheel catchers so as to propel said carriages while said carriages are in said deflection region, said apparatus further comprising a chain, wherein said first conveying segment comprises a first conveying segment section extending along a conveying direction, wherein said chain moves said carriages along said first conveying segment section, wherein said first first-entrainer is controlled such that when a wheel catcher of a carriage engages a carriage-catching area of said first conveying wheel, a carriage-catching surface of said first first-entrainer moves in said rotation direction of said first conveying wheel, thereby accelerating said carriage.

17. An apparatus for use in a conveying system that comprises a plurality of carriages guided on a guide of a first conveying segment, each of said carriages comprising a wheel catcher, said apparatus comprising a first conveying wheel that rotates in a rotation direction about a wheel axis, wherein said first conveying wheel comprises carriage catching areas, each of which is associated with one of a plurality of first entrainers, wherein said first entrainers are disposed along a periphery of said first conveying wheel, wherein said first entrainers comprise a first first-entrainer, wherein said first first-entrainer comprises a carriage-catching surface that faces said rotation direction and that cooperates with a wheel catcher on a carriage, wherein each of said first first-entrainer is controllable independently of other first entrainers, and wherein said first first-entrainer is configured to move a catch surface thereof in a direction opposite said rotation direction, said apparatus further comprising a second conveying wheel identical to said first conveying wheel, wherein said first and second conveying wheels are disposed at opposite ends of said first conveying segment, wherein said first conveying wheel is disposed at a first deflection region of said first conveying segment and said second conveying wheel is disposed at a second deflection region of said first conveying segment, wherein said first and second deflection regions define opposite ends of a first conveying segment section of said first conveying segment.

* * * * *